INVENTORS
CHARLES W. BROUWER
ALAN H. NORRIS
BY
ATTORNEYS

United States Patent Office 3,434,673
Patented Mar. 25, 1969

3,434,673
DRIVE MECHANISM
Charles W. Brouwer, East Greenwich, R.I., and Alan H. Norris, Somers, Conn., assignors to Leesona Corporation, Warwick, R.I., a corporation of Massachusetts
Filed Mar. 3, 1967, Ser. No. 620,531
Int. Cl. B65n 54/00
U.S. Cl. 242—18.1         21 Claims

ABSTRACT OF THE DISCLOSURE

Method and apparatus for operating a drive roll which is freely rotatable on a drive shaft by operating an electromagnetic clutch to periodically connect and disconnect the drive roll to the drive shaft. Where a winding machine employs a plurality of drive rolls, the clutch is periodically operated to disconnect at least one of the drive rolls from the drive shaft while maintaining the remainder of the drive rolls so connected.

---

This invention relates to a yarn winding machine and more particularly to a machine of the type in which the yarn take-up package is driven by a drive roll which rotates in frictional engagement with the package.

Throughout the following specification and claims, the term "yarn" is employed in a general sense to apply to all kinds of strand material, either textile or otherwise, and the designation "package" is intended to mean the product of a winding machine, whatever its form.

In the winding of yarn, it has been recognized as desirable to provide some means for controlling the disposition of the turns of winding on the surface of the package to prevent "patterning," that is, the formation of bands or "ribbons" which develop on a package surface when the yarn coils are crowded together or piled in contiguous relation. Patterning occurs when the circumference of the winding package bears a simple numerical relationship to the circumference of the traverse roll such that the winding yarn tends to follow the same path onto the roll in the course of successive rotations thereof. The bands or ribbons continue to be formed until such time that the package grows to a size at which its circumference no longer bears a simple numerical relationship to the circumference of the traverse roll.

An effective method of preventing patterning, which has found widespread use consists in periodically decelerating, then accelerating the driving traverse roll in a manner to cause slippage between the package and the roll so as to alter the usual angle of wind and hence disrupt the synchronous winding of yarn. Such an operation has heretofore been achieved in a number of ways, one popular procedure being to alternately open and close the circuit of one or more windings of an electric drive motor to decelerate, then accelerate the motor's drive shaft and therefore the traverse roll. The power required under this known procedure is a function of the frictional force between the traverse roll and the package being wound, as well as the time interval during which power is applied. Sufficient slippage for ribbon breaking was achieved only by substantially decreasing the speed of the traverse roll so that a standard motor of a size having a minimum of reserve power was capable of developing sufficient energy to thereupon quickly accelerate the motor to full load speed and effectively return the traverse rolls to operating speed. For example, a typical application of this procedure might call for a traverse roll normally rotating at 4000 r.p.m. to be decelerated to 3600 r.p.m. and thereupon accelerated to restore its speed to 4000 r.p.m. at a recurring rate of approximately 40 times per minute. However, this procedure had the undesirable effect of reducing the productivity of the winding machine, that is, the amount of yarn which could be wound within a given period of time, because the average yarn winding speed was considerably less than the operational winding speed in the absence of slippage.

It has also been known to be desirable to employ traverse rolls which are of a relatively heavy or dense material, cast iron being a typical example. Among other reasons, traverse rolls of a heavy or dense material are often preferred to those of lighter materials because of the generally superior wear characteristics of the former at a relatively low expense. However, to employ traverse rolls of this nature on a multi-station winding machine wherein the winding speed of the traverse shaft is caused to fluctuate in the known manner so as to prevent patterning would require the use of a drive motor of impractical size.

Another undesirable condition imposed by many known winding machines occurs when the surface speed of the package differs substantially from that of the traverse roll with the result that the yarn does not traverse completely across the length of the package. This condition is alternately referred to as "short traversing" or "scrambling" and takes place, for example, when a stationary package is abruptly brought into driving engagement with the traverse roll rotating at operational speed or when the package and traverse roll are brought up to operational speed at different rates of acceleration. That is to say, that because the package is rotating at a slower surface speed than the traverse roll, it is not disposed to receive yarn to the degree that the traverse roll is capable of guiding yarn thereto. The result is a package of inferior wind which often impedes further rewind operations. This condition continues until such time that the surface speed of the package substantially matches that of the traverse roll. Under these circumstances, there are also such other undesirable effects as burnishing and fibrillation of the outer layers of yarn on the package. Besides being harmful to the yarn itself, an additional detriment of engaging a package at rest with a rotating traverse roll results from the fact that the yarn is so disturbed thereby as to hamper successive end finding attempts.

The present invention was conceived with the foregoing difficulties in mind and to this end is directed to a novel drive mechanism for operating the drive rolls of a winding machine. More properly, the invention provides for a traverse roll which is freely rotatably on the drive shaft of a winding machine. An appropriate clutch mechanism for periodically connecting the traverse roll to the drive shaft for rotation therewith and for disconnecting the traverse roll therefrom is provided and operates according to a predetermined time sequence. Preferably of an electromagnetic nature, the novel clutch mechanism is successively energized and deenergized by means of pulsed electromotive forces. In the course of operating the invention, the magnitude of rotational energy applied to the traverse roll is variable, being a function of three parameters, viz., the force applied to the clutch, the duration of the force applied, and the frequency thereof, such that rotation is actively imparted to the traverse roll during that interval when the clutch is energized.

For the invention to serve effectively in preventing the formation of ribbons, the traverse roll is desirably slowed down and thereupon quickly returned to its normal operating speed in order to induce the slippage between traverse roll and package necessary therefor. However, it has frequently been observed that unless the traverse roll is positively braked, its rotational speed remains essentially constant during the deenergized interval by reason of the flywheel effect and the bearing friction between the traverse roll and the drive shaft, both of which tend to continue its motion. Therefore, it is desirable to provide a brake operable to sufficiently slow the roll relative to the drive shaft whereby the next succeeding pulse of energy to the clutch is effective to cause package slippage. The quality of ribbon breaking is dependent upon the extent to which the traverse roll is slowed as well as the torque subsequently applied thereto for its return to normal speed. By reason of the invention, the torque available to drive the traverse roll when employing a driven motor of a conventional size, is sufficiently great that the traverse roll need not be slowed to the extent heretofore necessary. Additionally, each cycle of the operation can be performed within a time interval which assures a rapid return of the traverse roll to its normal winding speed. The average winding speed of a machine employing the invention is therefore significantly greater than that of many conventional machines employing known methods of ribbon breaking.

The invention is particularly applicable to a multiple station winding machine of the type disclosed in commonly assigned U.S. Patent 2,764,362. In practice with apparatus disclosed in said patent, it is desirable to arrange groups or banks of traverse rolls so that they are energized and deenergized from a common source of power at slightly different or staggered times. According to this arrangement, each group of rolls is rotatable as a unit and is preferably connected to the drive shaft at a slightly different interval than the remaining groups. By so doing, the drive motor senses a substantially constant load throughout the winding operation, but the load is considerably reduced because it is driving less than all of the traverse rolls of the winding machine at any given instant.

Although the traverse rolls are preferably arranged in groups or banks, an added feature of the invention resides in the ability to quickly and easily deenergize the clutch of a single roll within a group should that be desired without adversely affecting the operation of the machine at any of the remaining winding assemblies.

Because the drive motor is subjected to only a fraction of the load as in conventional practice, the present motor can be replaced by one of reduced size with a corresponding economy, or heavier traverse rolls of the wear resistant variety can be employed with no detrimental effect to the operation of the machine.

Another advantage of the invention resides in the fact that continuous engagement is thereby maintained throughout the winding operation between the winding package and the traverse roll. That is to say that upon the commencement of winding, the package core is brought up to speed in surface-to-surface engagement with the traverse roll, and that the only slippage therebetween consists of the controlled slippage referred to heretofore for the purpose of preventing the formation of ribbons. Likewise, the winding package is brought to a halt or again brought up to speed in a manner assuring its continuous engagement with the traverse roll, the only slippage therebetween consisting of the afore-mentioned controlled slippage. Such operation prevents scrambling and reduces such other undesirable effects as yarn burnishing and fibrillation whereby the outer layers of yarn on the package remain relatively undisturbed even after several stopping and starting sequences. Additional yarn piecing attempts such as normally occurs in the course of operation of an automatic winding machine are thus made possible. This lends to the increased overall efficiency of the winding machine.

Accordingly, it is a primary object of the present invention to provide a method and apparatus for operating a drive roll at periodically varying speeds.

Another object of the invention is the provision of a method and apparatus for operating a plurality of drive rolls by connecting them to a source of power for rotation at a predetermined speed and disconnecting periodically the source of power to at least one of the drive rolls while maintaining the remainder of the drive rolls connected to the source of power.

Yet another object is the provision of a drive roll mechanism which operates to impart energy to the drive roll intermittently.

Another object of the invention is to provide a drive roll mechanism which imparts energy to the roll intermittently and at random.

Another object of the invention is to provide a drive roll mechanism whereby the drive roll can be braked to a halt without affecting power to said drive roll mechanism.

Another object of the invention is to provide a drive roll and means for intermittently applying torque to the drive roll for rotation thereof, the torque applied being substantially greater than the level of torque required to merely sustain rotation thereof.

Another object of the invention is the provision of a yarn winding machine employing a new and improved mechanism effective to prevent patterning.

Still another object of the invention is the provision of an improved pattern breaker which is operable in the course of initially accelerating the package as well as during the normal winding operation.

A further object of the invention is to provide a pattern breaker of a construction which permits a high average winding speed.

Yet a further object of the invention is the provision of a multi-station winding machine having a substantially reduced power requirement.

Yet another object of the invention is to provide a winding machine wherein the yarn package rotates in surface-to-surface engagement with a grooved traverse roll during the normal winding operation and wherein the package and traverse roll continue to maintain surface-to-surface engagement in the course of accelerating and decelerating the package.

Yet a further object herein is the provision of a coupling mechanism which is selectively operable to serve alternately as a driving means and as a braking means.

A still further object of the invention is the provision of a mechanism which is capable of winding yarn economically and without ill effects thereto.

Still another object of the invention is to provide a multiple station winding machine wherein operations at one station may be interrupted without disturbing operations at neighboring stations.

Other and further objects will be apparent or will appear in the specification which follows, taken together with the accompanying drawings in which like numbers refer to like parts throughout.

Figure 1:
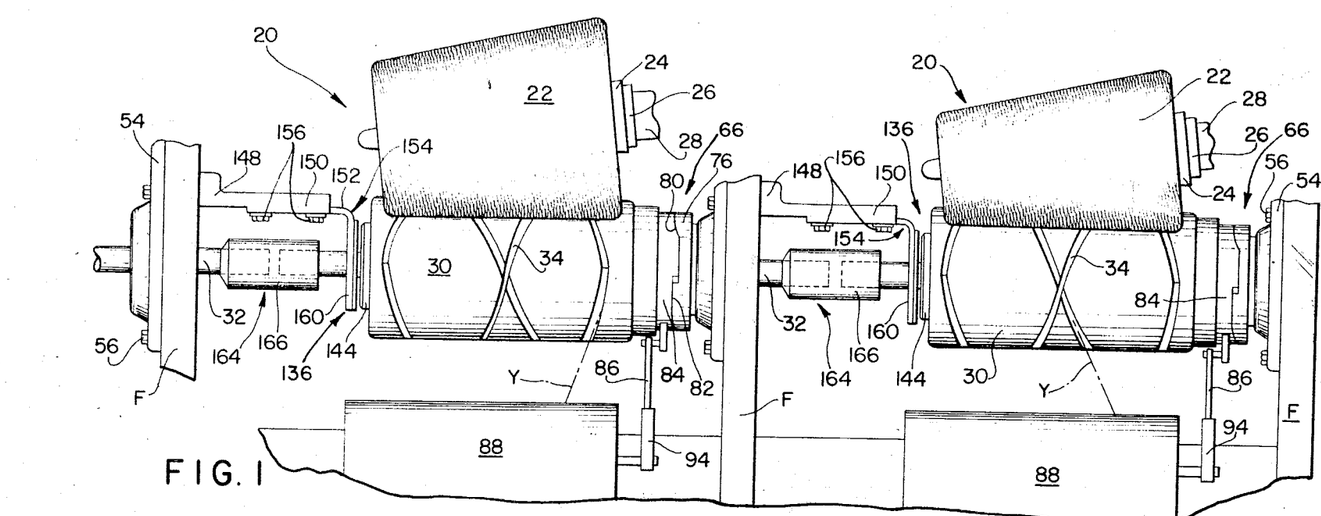
FIG. 1 is a front elevation view of a pair of adjacent winding assemblies on a multiple station winding machine constructed in accordance with the invention.

Refer now to the drawings and in particular to FIG. 1 wherein a typical pair of winding stations 20 supported on a frame F employing the invention are illustrated. Although modern commercial winding machines generally have a plurality of winding assemblies in side-by-side relationship, the greater part of the following description will be addressed to only one such assembly which is typical of all others.

A take-up package 22 being wound upon a conical yarn holder or core 24 is shown supported on a winding mandrel 26. Mandrel 26 is mounted for rotation upon a shaft 28 which is connected to the remainder of the winding machine in a conventional manner to permit the package to grow in size as the yarn is wound thereon. In the drawings, the machine is arranged for the winding of yarn Y on a conical package, but it will be understood that other shapes and types of packages could be wound as well by replacing the conical mandrel 26 and core 24 with other mandrels and cores appropriate to the formation of the particular package desired.

Package 22, core 24, and mandrel 26 are adapted to be rotated by frictional contact of the package surface with the periphery of a cylindrical traverse roll 30 disposed upon a drive shaft 32. Traverse roll 30 is provided on its periphery with an endless groove 34 which upon its rotation is adapted to engage the yarn Y being delivered to package 22 and guide said yarn back and forth longitudinally of the package.

Figure 5:
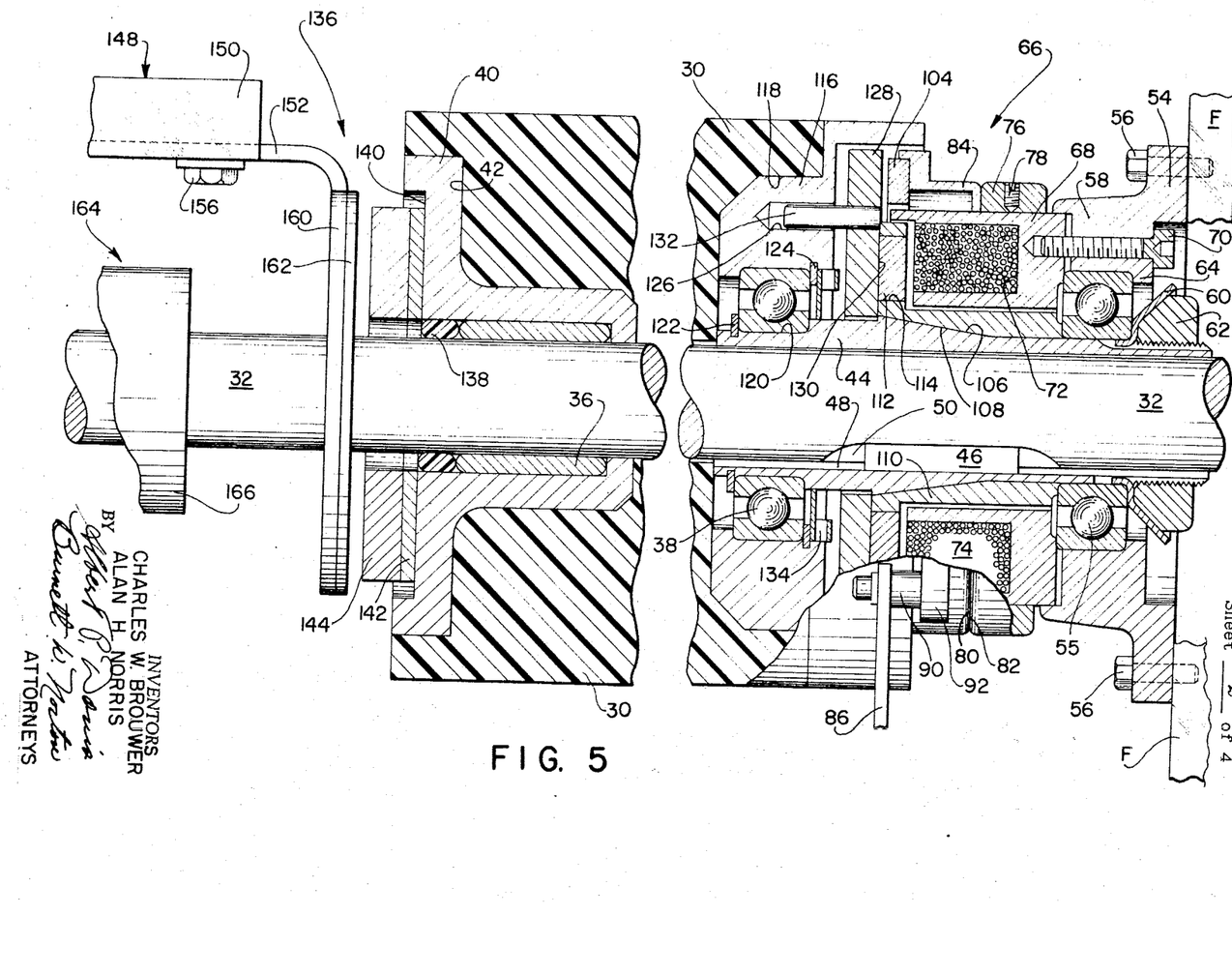
FIG. 5 is an enlarged front elevation view, partly in section, to illustrate the clutch mechanism and representing the clutch mechanism in the engaged condition.

As is most readily seen in FIG. 5, traverse roll 30 is freely rotatable on drive shaft 32 by reason of bearings 36 and 38 located at opposite ends thereof. A hub 40 is applied by a press fit to the recess 42 formed in the left hand end of traverse roll 30 as viewed in FIG. 5 and is supported on the journal bearing 36 composed of a sleeve of wear resistant material which is bonded or otherwise secured to said hub. Viewing FIG. 5, adjacent the other end of the traverse roll, a sleeve 44 is connected to shaft 32 for rotation therewith by means of a key 46 extending between a slot 48 in said sleeve and a keyway 50 formed in said shaft. Flanges 54 are secured to spaced portions of frame F (as shown in FIGS. 1 and 5) as by bolts 56 which serve to support the drive shaft 32 as well as to accurately locate traverse rolls 30 and their associated mechanisms in operative winding position. Shaft 32 extends through an annular extension 58 of each flange 54 and is rotatably supported thereon by means of a bearing 55. The inner race of bearing 55 is received by a force fit over the sleeve 44 and the outer bearing race is fittingly received within the extension 58. The inner race of bearing 55 is held against movement on sleeve 44 as by a washer 60 and nut 62 which is engaged on a suitably threaded end of sleeve 44 in the normal manner. Likewise, the outer race of bearing 55 is held against movement by means of a rim 64 on the extension 58.

Figure 4:
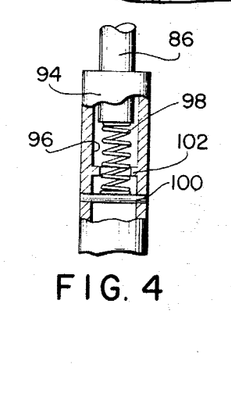
FIG. 4 is a detail view partly cut away and in section to show more clearly certain elements illustrated in FIG. 1.

A magnetic clutch 66 is mounted cooperatively with each traverse roll 30 of the winding machine as best shown in FIGS. 1 and 5. A housing 68 of a ferromagnetic material such as steel is fixedly mounted to extension 58 by screws 70. The housing 68 has a cavity 72 formed therein within which is disposed a wound coil 74 of electrically conductive material such as copper. A ring-like member 76 is adjustably mounted on the outer periphery of coil housing 68 as by one or more radially directed set screws 78 which allow for its angular and axial adjustment thereon. A cam surface 80 of member 76 is engaged by a mating surface 82 of a cam follower 84 which is fitted closely to the outer periphery of said coil housing, but slidable thereon. A brake actuating link 86 extends downwardly from a cam follower 84 toward each control unit 88 of the associated winding station 20. Each said link 86 is pivotally connected to an axially directed pin 90 embedded in a radially extending ear 92 on the periphery of each said cam follower 84 and is operable to rotate each cam follower 84 relative to its associated cam member 76. Viewing FIG. 1, it is seen that each link 86 extends downwardly toward an associated connecting member 94 which in turn connects with suitable operating mechanism within the associated control unit 88 to shift the connecting member 94 and link 86 generally vertically. As best seen in FIG. 4, at least the upper end portion of the connecting member 94 is of a tubular construction having a bore 96 which receives therein a complementary bottom portion of the link 86 so as to allow the link 86 to slide freely therein in the axial direction. A tension spring 98 reaches from a diametrically extending pin 100 having its ends embedded in the side walls of the member 94 to the lowermost extremity of the link 86. A ring-like shoulder 102 is formed within the bore of the member 94. Thus, it will be seen that the linkage constituted as link 86 and member 94 is extensible within the limits imposed by the shoulder 102 in the fully retracted position and by the elastic limit of the spring 98 in the fully extended position.

Bonded to the face of cam follower 84 opposite cam member 76 is a brake shoe 104 composed of a suitable frictional material. The engaging surfaces 80, 82 of cam member 76 and follower 84 respectively are so fashioned that clockwise rotation of said follower as seen from the right hand end of FIG. 5, serves to move brake shoe 104 leftward (FIG. 5) while counterclockwise rotation of said follower as seen from the same vantage point serves to move said brake shoe to the right.

Viewing FIG. 5, the outer surface of sleeve 44 is provided with a tapered portion 106. An inner bore 108 of a rotor 110 is of a shape similar to said tapered portion 106 and is received thereon by way of a force fit. A band 112 of frictional material is bonded to the face portion 114 of the rotor 110 to form one engaging surface of the magnetic clutch 66. A hub 116 is fittingly received within a recess 118 formed at one end of traverse roll 30 and is supported on the outer race of bearing 38 which is fitted tightly thereto. The inner race of bearing 38 is snugly received over the end of sleeve 44 in a region 120 of reduced diameter and held against axial movement in one direction by the shape of the sleeve itself and in the other direction by a lock washer 122 engaged with the sleeve. Another lock washer 124, identical to washer 122, is engageably received in the hub 116 opposite to washer 122 as an aid in positioning hub 116 relative to shaft 32.

A plurality of cylindrical cavities 126, axially directed, are formed in hub 116 preferably located at the same radial distance from the center of shaft 32 and preferably equally spaced in azimuth therefrom. A disc-shaped armature 128 composed of steel or other ferromagnetic material, is positioned in a plane perpendicular to the axis of shaft 32. The face 130 of the armature 128 is preferably ground to a smooth finish to engage with the frictional band 112 in the face of the rotor 110 as well with the brake shoe 104. Embedded in the armature 128 and extending outwardly from one surface thereof is a plurality of guide pins 132 which are slidably received in the cavities 126. Thus the armature 128 is fixed to the traverse roll 30 for rotation therewith via pins 132, but is axially movable with the pins relative thereto. A spring washer 134 contained within the hub 116 adjacent the lock washer 124 tends to bias armature 128 in the direction of rotor 110.

A braking device is provided at the left hand end of the traverse roll (see FIG. 5), a preferable form being an eddy current brake as shown generally at 136. As earlier explained, the hub 40 is press fitted into a recess 42 in the traverse roll 30 and is supported on the surface of the bearing 36. The bearing 36 is received in a press fit between shaft 32 and hub 40, and a ring 138 is likewise received in a press fit therebetween adjacent a recess 140 formed in the end surface of said hub. Ring 138 acts as a dust guard and lubricant retainer for the bearing 36.

A plate 142 of disc shape and composed of steel or other ferromagnetic material is suitably bonded to the hub 40 within recess 140 and is formed with a central aperture to clear shaft 32. Likewise, a permanent magnet 144 of a shape similar to said plate 142 is bonded thereto.

Figure 7:
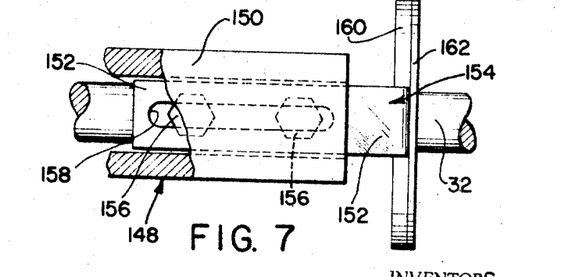
FIG. 7 is a detail top plan view, partly cut away and in section, of the eddy brake adjusting mechanism of the present invention.

As best seen in FIGS. 1, 2, 5 and 7, a cantilever 148 is suitably fixed to the frame F of the winding machine and extends substantially parallel to shaft 32. The cantilever 148 is provided with a channel 150 arranged to receive a horizontal extension 152 of a support bracket 154. A pair of binding screws 156 are threadedly engaged in the cantilever and extend into the channel as best seen in FIG. 7 (Sheet 4). Horizontal extension 152 has an elongated slot 158 therein to permit sliding movement of said extension within channel 150. The binding screws 156 may be tightened to secure the bracket 154 in position on cantilever 148. It will be seen the bracket 154 also includes a depending portion 160 which is integral with the horizontal extension 152 and is apertured to clear the shaft 32. The depending portion 160, preferably composed of steel or other ferromagnetic material, has a disc 162 preferably of copper or other electrically conductive material bonded thereto. Disc 162 is also centrally apertured to clear the shaft 32. It will be obvious that the spacing or air gap between magnet 144 and copper disc 162 is adjustable by reason of cooperating screws 156 and the elongated slot 158 which permit relative movement therebetween. Screws 156 may be loosened and the positioning of bracket 154 altered, as desired.

Figure 2:
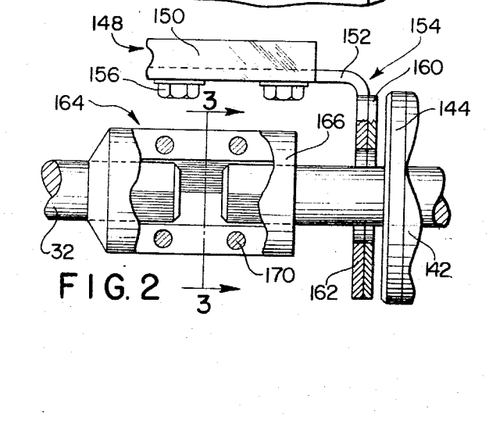
FIG. 2 is a detail view partly cut away and in section to shown more clearly certain elements illustrated in FIG. 1.
Figure 3:
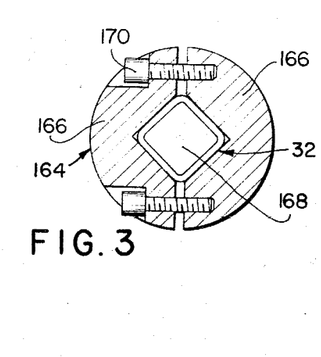
FIG. 3 is a section view taken along line 3—3 of FIG. 2.

With particular reference to FIGS. 1 and 2, it is seen that shaft 32 is discontinuous for ease of maintenance. It may be preferable to provide a separate length of shaft 132 for each traverse roll 30, such an arrangement being illustrated in FIG. 1, although practical considerations may require a separate length for two or more traverse rolls. Adjacent lengths of shaft 32 are joined by means of a coupling 164 having two identical segments 166, the segments best seen in FIG. 3. The ends of the adjacent lengths of the shaft 32 are formed into a square cross-section as indicated at 168 and the interior surfaces of each segment 166 are V-shaped to engage with the squared surfaces of the shaft ends. Screws 170 threadedly received into suitably tapped holes draw the two segments 166 together thereby operatively connecting the adjacent lengths of shaft 32.

It will be appreciated that with the construction disclosed, it is possible to remove a traverse roll and its associated mechanism at only one station without requiring the removal of the entire drive shaft and the remaining traverse rolls mounted thereon.

The mechanical structure of the invention having been fully described, its operation will now be explained.

A basic characteristic of the invention resides in the fact that several desirable objectives are simultaneously achieved by applying torque to the traverse roll 30 in a pulsed or intermittent manner. The operation of the invention involves actuating and deactuating the magnetic clutch 66 for periodically connecting the traverse roll 30 to the drive shaft 32 for rotation therewith, the clutch surfaces being defined by the band 112 on rotor 110 and the face 130 on armature 128. By means of a suitable mechanism such as a rotatable cam (not shown) located in the control unit 88 and acting through the link 86 and associated member 94, the cam follower 84 is movable from a withdrawn position whereat the surface of the brake shoe 104 lies in a plane to the right of the surface of the band 112 on the rotor 110 to an extended position whereat the surface of the brake shoe 104 lies in a plane to the left of the surface 112 and thereby engageable with the face 130 on the armature 128 as shown in FIG. 5. With cam follower 84 in the withdrawn position as shown in FIG. 5, the clutch 66 is actuated by applying an electromotive force to coil 74. A magnetic field is thereby induced which tends to draw armature 128 into engagement with rotor 110 thereby connecting traverse roll 30 with drive shaft 32 for rotation therewith. To deactuate the clutch 66, the electromotive force previously applied to coil 74 is switched off. Thereupon, the tendency for armature 128 to engage rotor 110 no longer exists and the traverse roll 30 is no longer drivingly connected with drive shaft 32.

Figure 9A:
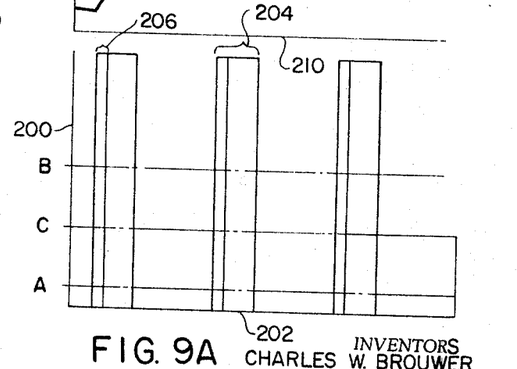
FIGS. 9A and 9B are graphs which diagrammatically illustrate the operation of the invention.

The graph in FIG. 9A diagrammatically illustrates the operation of the invention. This figure presents graphically the intermittent or pulsing operation of the invention for the operation of a single traverse roll 30 although obviously such operation is equally applicable to a group including two or more traverse rolls rotatable as a unit. FIG. 9A is a plot of traverse roll torque as indicated along the ordinate 200 versus time as indicated along the abscissa 202. Lines A, B, and C therein represent various levels of continuous torque energy as would be supplied by a conventional drive system. In this context, line A represents the amount of energy required to drive the traverse roll 30 and package 22 at the normal winding speed; line B represents the minimum amount of energy required to drive the traverse roll 30 in such a manner as to cause slippage between package 22 and said traverse roll; and line C represents the amount of energy required to accelerate the traverse roll 30 and package 22 from rest to operational speed.

Continuing with references to FIG. 9A, the area indicated generally by reference numeral 204 defines ideally the intermittent pulses of power which are applied to the traverse roll 30 by means of the invention through three-cycles by way of example. As used herein, the term "cycle" refers to that interval of time from the commencement of one pulse to the commencement of the next succeeding pulse 204. Pulses 204 result from the application of electromotive force to coil 74 and in magnitude are directly proportional thereto. Further, the pulses are of short duration compared with the time interval between successive pulses. For example, a typical operation may call for a pulse duration of 50 milliseconds and a time interval between pulses of 250 milliseconds, although the invention is not so limited, being capable of an infinite number of other time combinations. During the interval of time in which the energy applied to the clutch 66 exceeds the value of line B, the inertial force inherent in package 22 is greater than the frictional force between said package and traverse roll 30 such that the package can no longer rotate at the speed of the traverse roll and slippage occurs therebetween. The extent to which slippage occurs is a function of the magnitude of the electromotive force applied to the clutch 66, the duration thereof, the frequency thereof, and the reduction in speed of the traverse roll in the interval between power pulses.

In actual operation, only a fraction of the entire power pulse 204, as indicated, for example, at 206 in FIG. 9A, is required to maintain the traverse roll 30 and package 22 at the normal winding speed once that speed has been attained. The power represented by intermittent pulse 206, in an ideal situation, is identical to the power continuously supplied at the value of line A for the entire cycle, as in the instance of a conventional winding machine. Or, put in another way, the area represented by pulse 206 is ideally identical to that area lying between line A and the abscissa 202 for one cycle. During acceleration from rest, however, all of the power represented by pulse 204 is consumed by the traverse roll 30. Thus, the area represented by pulse 204 is ideally identical to that area lying between line C and the abscissa for one cycle.

Figure 9B:
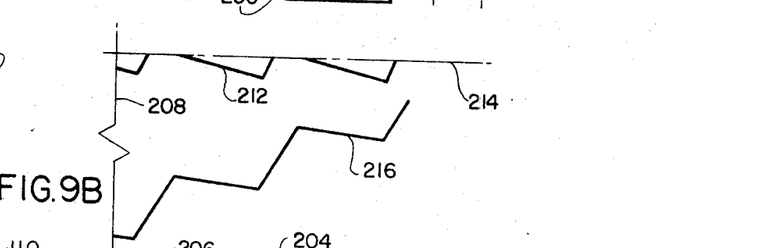

Reference is now made to FIG. 9B which is a graph plotting traverse roll speed, as indicated along the ordinate 208, versus time, as indicated along the abscissa 210 which is identical in scale to the earlier mentioned abscissa 202 in FIG. 9A. The curve indicated by reference numeral 212 represents the operation of the traverse roll 30 in accordance with the invention after it has been accelerated to operational speed. It is seen therein that during the interval of pulse 206, the traverse roll 30 is returned to operational speed indicated by the line 214 and continues at that rate during the remainder of pulse 204. Thereafter, when the coil 74 is deenergized in consequence of which the armature 128 disengages from rotor 110, the speed of the traverse roll decreases. This deceleration results from inherent frictional forces in the system and may be assisted by an external brake such as eddy current brake 136 until the next power pulse 204 again boosts said traverse roll 30 to operational speed indicated at line 214.

The curve indicated by a numeral 216 in FIG. 9B represents the operation of the traverse roll 30 during acceleration from rest. It is seen therein that during acceleration from rest, each succeeding pulse 204 causes the traverse roll 30 to reach a higher rotational speed than that achieved during each previous power pulse 204. It is also seen that the rotational speed of the traverse roll 30 is slightly reduced during the interval between pulses by means of the external brake 136 until the next power pulse 204 boosts the traverse roll 30 to yet higher speeds, eventually reaching the operational speed shown at line 214. The magnitude of each power pulse 204 is arbitrary and is adjustable by means to be described hereinafter whereby the rate of acceleration of the traverse roll 30 and package 22 can be desirably varied as well as the extent of controlled slippage of said package on said traverse roll for purposes of ribbon breaking.

It has been explained that one of the chief advantages of driving a traverse roll in a pulsed or intermittent manner resides in the ability thereby to prevent ribboning by causing the package to periodically slip on the traverse roll. However, it might often occur that the mass of the traverse roll 30 is sufficiently great, particularly if it is of a dense material such as cast iron, that the rotational speed thereof is only slightly reduced during the time interval between pulses with the result that little or no slippage actually occurs at the time of the next succeeding power pulse. Since the amount of slippage occurring between traverse roll 30 and package 22 is a function, among other variables, of the reduction in speed of the traverse roll between pulses, it is clear that some form of brake would be an important element for preventing patterning. The eddy current brake 136 is a preferred mechanism for performing this task.

To this end, the permanent magnet 144 is bonded to and rotated with the traverse roll 30 in close proximity to the copper disc 162. The strength of the magnetic field emanating from magnet 144 is concentrated by the ferromagnetic plate 142 to which said magnet is bonded and by the ferromagnetic portion 160 to which copper disc 162 is bonded. When the traverse roll 30 is rotated and magnet 144 therewith, electric currents, commonly called eddy currents, are induced in the copper disc 162. These eddy currents themselves support a magnetic field which varies directly with the rotational speed of magnet 144 and varies inversely to the distance between the magnet 144 and the copper disc 162 and which is in opposition to the field emanating from the magnet 144. The braking effect thus created retards the traverse roll 30 sufficiently during the time interval between pulses 204 to afford ribbon breaking during each said pulse.

Figure 10:
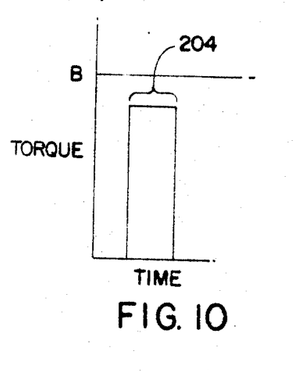
FIG. 10 is a graph similar to FIG. 9A diagrammatically illustrating the operation of the invention under certain desired circumstances.

There may be occasions when it would be unnecessary or undesirable to prevent patterning. In these instances, it would not be necessary to employ the eddy current brake 136. Furthermore, it is not required that the torque level of power pulses 204 exceed the value of line B (FIG. 9A) for the invention to be operable. While pulses 204 should exceed the value of line B in order for the invention to operate to prevent patterning, it will still be operable as an effective drive mechanism should power pulses 204 be of a magnitude diminished from the value of line B, as witnessed in FIG. 10.

It has already been pointed out that the invention is particularly valuable when practiced on a multi-station winding machine of the type disclosed in the prior cited U.S. Patent 2,764,362. For this purpose, as previously explained, it is desirable to divide the drive rolls 30 of the various winding stations into groups or banks consisting of one or more rolls with an individual clutch associated with each roll. It has also been previously discussed that the individual clutches 66 within each group are actuated at similar times while the several groups of clutches are actuated at times staggered in relation to each other. This procedure can be clearly seen with reference to FIG. 11 wherein there are graphically illustrated a plurality of power pulses 204, each of the pulses representing the application of power to one of the groups of clutches 66. The groups of clutches are schematically designated by successive Roman numerals in FIG. 11, three groups being indicated, although the number chosen is arbitrary. When the pulse 204 applied to the clutches constituting Group I ceases, a new pulse 204 is immediately applied to those clutches constituting Group II. This procedure is continued through all the groups, cycle after cycle. In a general sense, the power to drive the shaft at any particular instant need only be as great as that necessary to drive any one of the groups of traverse rolls 30 through their associated clutches 66. The power requirement for the winding machine 20 is therefore substantially reduced whereby the size of the drive motor and shaft can be reduced accordingly. In the alternative, heavier, more wear resistant traverse rolls can be installed in place of lighter, perhaps less wear resistant traverse rolls which may have been in use heretofore.

Figure 8:
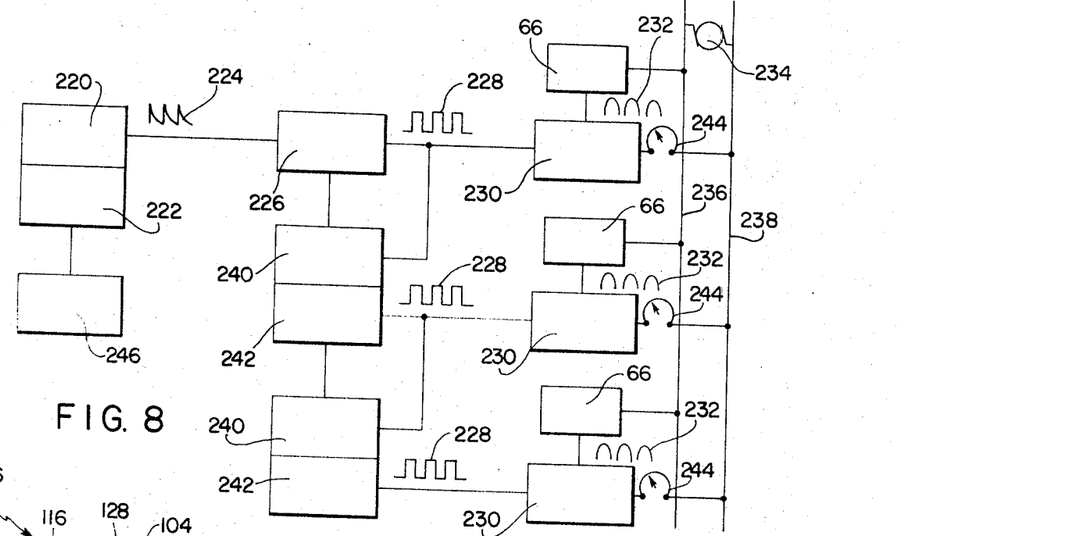
FIG. 8 is a block diagram of a typical electronic circuit which serves as the timing control system for operating the invention.

FIG. 8 is a block diagram of an electronic timing circuit suitable to control the operation of the mechanism described. A trigger pulse generator 220, one example being a blocking type oscillator, having a power supply 222, generates an output voltage signal as indicated at 224. Signal 224 activates a variable width gate generator 226 associated with Group I of FIG. 11, one example of which is a monostable multivibrator which generates an output voltage signal 228 of square waveform. The trailing edge of the voltage signal 228 serves to trigger an electronic switch 230 which may be a gated gaseous or solid state device such as a thyratron or silicon gate-controlled switch, and the half sine wave of current 232 permitted to flow therethrough indicates the timing according to which an electric current from a suitable source 234 of AC voltage is directed to all coils 74 associated with Group I of FIG. 11 via conductors 236, 238.

Figure 11:
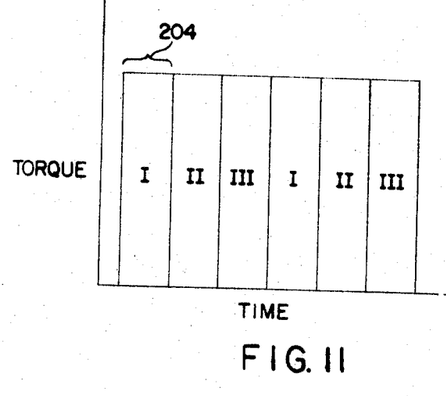
FIG. 11 is a graph similar to FIG. 9A diagrammatically illustrating one mode of operating the invention when applied to a winding machine having a plurality of associated winding stations therein.

At the same time that the trailing edge of voltage signal 228 triggers the electronic switch 230, said signal further is inverted in any typical differentiating network 240 and thereupon activates the gate generator 242 associated with Group II of FIG. 11. The procedure for activating the circuit components associated with the remaining groups is the same as for that of Group I just described. Finally, upon the activation of the clutches in Group III of FIG. 11, trigger generator 220, synchronized with the various gate generators 226 and 242, once again generates a signal 224 to activate the gate generator 226 associated with Group I of FIG. 11 to begin a new cycle of events identical to the cycle just described. Each time an electronic switch 230 is triggered so as to permit the flow of electric current to one or more coils 74, the power transmitted to each of the clutches 66 is of a magnitude indicated schematically by power pulses 204 as shown in FIGS. 9A and 11. The amount of power transmitted to the clutches 66 is a function of the magnitude of source voltage 234, the duration of each power pulse 204, and the frequency of the pulses 204. The characteristics of the invention are therefore alterable by adjustments effected in any conventional manner to pulse voltage, pulse duration, and pulse frequency.

Figure 12:
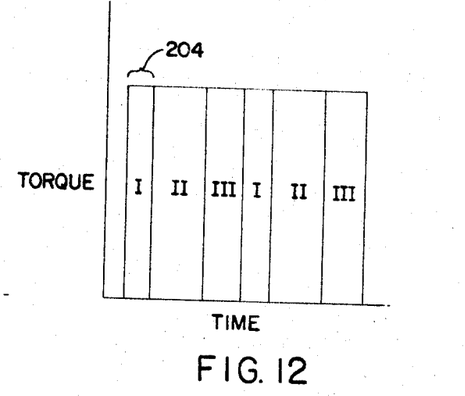
FIG. 12 is a graph similar to that illustrated in FIG. 11 demonstrating another mode of operating the invention.

Another desirable property of the invention resides in the ability to adjust the variable width gate generators 242 associated with the different groups of clutches 66 whereby the period of actuation of one group can be made different from that of another group. This mode of operation can be seen in FIG. 12 wherein each of Groups I, II, and III is actuated for a different time period. The particular time period may be chosen according to the particular type of yarn being wound. To illustrate, one type of yarn may have a much higher coefficient of friction than another yarn. It would therefore be appropriate to alter the time period according to the type of yarn being wound such that a power pulse 204 of longer relative duration is supplied to a traverse roll 30 winding an abrasive yarn, while a power pulse 204 of shorter relative duration is supplied to a traverse roll 30 winding a smooth yarn.

Figure 13:
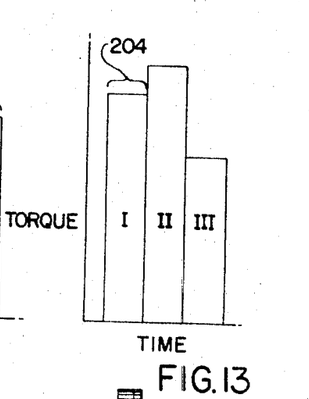
FIG. 13 is a graph similar to that illustrated in FIG. 11 demonstrating yet another mode of operating the invention.

Instead of altering the time period of power pulses 204 to achieve a style of winding in conformity with the type of yarn being wound, it is possible to vary the magnitude of power pulses 204 as seen in FIG. 13. This can be accomplished, for example, by means of rheostats 244 (see FIG. 8) each of which is placed in series with the electronic switch 230 and clutch 66, whereby the rheostat associated with each group of winding assemblies is individually adjustable for that purpose.

Thus, by reason of the invention, the frequency and intensity of patterning can be controlled, average winding speed can be substantially increased, and the load on the drive motor and drive train at any given time can be substantially reduced. Because of the magnitude of torque made available by the invention to drive each traverse roll 30, a further advantage thereof resides in the ability to start the winding operation with both the core 24 and the traverse roll 30 at rest and in surface-to-surface engagement. In this manner, the package 22 and the traverse roll 30 are accelerated to operational speed simultaneously without the harmful effects which occur when a stationary package is abruptly brought into engagement with a rapidly rotating traverse roll. Substantially, the only slippage which occurs between the traverse roll 30 and package 22 during this period is the controlled intermittent slippage resulting from each power pulse 204 when the level of torque is in excess of the value of line B as depicted in FIG. 9A.

As previously mentioned, the acceleration of the traverse roll 30 and the package 22 is in part a function of the frequency and duration of power pulses 204 which is diagrammatically illustrated in FIG. 9A. The acceleration of traverse roll 30 is also dependent upon source voltage 234 (see FIG. 8) while the acceleration of package 22 is also dependent upon source voltage 234 but only to the extent that said voltage imparts to the traverse roll a torque which is less than the value of line B shown in FIG. 9A. That is, when the torque is greater than the value of line B, the package is caused to slip on the traverse roll and during this period the package does not experience a rate of acceleration matching that of the traverse roll.

Figure 6:
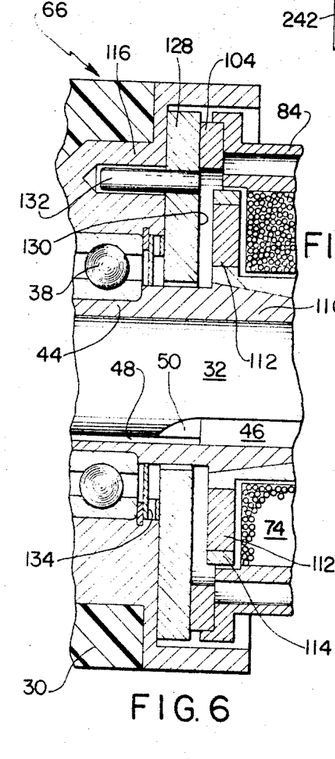
FIG. 6 is a detail view in section of a portion of FIG. 5 and representing the clutch mechanism in the disengaged condition.

Similarly, the package 22 can be decelerated and braked to a halt according to the invention with the package maintained in continuous surface-to-surface engagement with the traverse roll. For example, in the apparatus of earlier cited U.S. Patent 2,764,362, when the supply yarn becomes exhausted or is interrupted as by breakage at one of the winding stations, a breakage lever (not shown) actuates a mechanism (also not shown) within the control unit 88 of the winding machine. In turn, this mechanism operates to lift the brake actuating link 86 and connecting member 94 to rotate the cam follower 84 in the clockwise direction as viewed from the right hand end of FIG. 5. In consequence thereof, the brake shoe 104 is moved leftwardly from the formerly withdrawn position as seen in FIG. 5 and into engagement with the surface of armature 128. This engaged position is shown in FIG. 6. Thereupon, at the first interval of a series of cycles when the magnetic field is negligible or at a minimum, the rotational energy of momentum of the traverse roll 30, during the normal course of winding, acts through the frictional connection between the armature 128 and the brake shoe 104 to continue the rotation of the cam follower 84 which was initiated by the exhaustion or interruption of yarn Y.

The extent to which the brake shoe 104 advances leftwardly as well as the delay in time before it actually engages with the armature 128 is dependent upon the axial and angular positioning of the cam 76 on the coil housing 68, the positioning being manually achieved in the manner indicated previously. This continued rotation of the cam follower 84 lifts the brake actuating link 86 and its associated member 94 to a greater height than that achieved by the mechanism within the control unit 88. To avert the possibility of damage to the mechanism within the control unit 88 as a result of this additional movement of the link 86, said link is resiliently connected to the member 94 in the earlier described fashion, sliding axially within the bore 96 formed therein and extending the tension spring 98. Rotation of the cam follower 84 continues until the armature 128 has assumed the extreme leftward position as seen in FIG. 5, held firmly against the spring washer 134 by the cam follower 84 and the brake shoe 104 thereon.

With the armature 128 separated from the rotor 110, drawn into the position shown in FIG. 6, and bearing firmly against the spring washer 134, the brake shoe 104 quickly brings the traverse roll 30 to a halt, the package 22 yet in surface-to-surface engagement thereon. It will be appreciated, therefore, that with the apparatus of the present invention, unlike many conventional winding machines, a traverse roll can be brought to a halt at one station without interrupting the winding operation taking place at the remaining stations of the winding machine. In effect, the cam follower 84 acts as a mechanical switch connecting the traverse roll 30 to the drive shaft 32, or disconnecting the traverse roll from the drive shaft by adjusting the air gap between the armature 128 and the rotor 110.

According to the method of braking just described, the armature 128 is moved substantially beyond the effective magnetic field induced by coil 74. Thus, the braking force is solely a function of the pressure between the brake shoe 104 and the armature 128 as determined initially by the force imparted to link 86 from mechanism (not shown) within the control unit 88. Subsequently, however, the force imparted to the link 86 from said mechanism is imparted by a combination of the frictional drag between the brake shoe 104 and the armature 128, and the rotational speed of the traverse roll 30. It will be appreciated that the rotation of the traverse roll 30 is a function of braking in that the rate at which the brake shoe 104 is drawn against the armature 128 is directly proportional to the rotational speed of the traverse roll 30. That is to say, the greater the speed of the traverse roll and therefore its momentum, the more firmly the brake shoe 104 bears against the armature 128 as the surface 82 of the cam follower 84 rides up on the cam surface 80 of cam member 76.

Another method of braking, however, consists of moving the armature 128 out of surface engagement with rotor 110, but only to a slight degree whereby armature 128 is maintained substantially within the magnetic field induced by coil 74 and is subject thereto. Although the brake shoe 104 is moved into engagement with armature 128, the braking operation according to the method now being described is primarily controlled by means of the electronic timing circuit seen in FIG. 8 which controls the quality and quantity of electric current passing through coil 74, and therefore the force drawing armature 128 against brake shoe 104. Thus, during the braking operation or even during any prolonged period of deceleration, the operation of the traverse roll 30 can be closely controlled. For example, with this arrangement, it is possible to halt the traverse roll 30 and the package 22 as winding is yet in progress, while continuing to prevent patterning throughout the deceleration period. Of course, the power pulses 204 can be adjusted during this period as during the usual winding operation to drive the traverse roll 30 according to any other desired program which is within the capability of the invention.

When the package 22 comes to rest preliminary to the end joining operation, it may be withdrawn from the traverse roll 30 in the known manner in order to perform the end finding and uniting operation as described in the previously cited U.S. Patent 2,764,362. Following the end finding and uniting operation, the package 22 is once again moved into engagement with traverse roll 30, which continues to be held at rest by means of brake shoe 104. Thereupon, suitable mechanism (not shown) in the control unit 88 of the winding machine 20 operates through link 86 and its associated member 94 to rotate cam follower 84 in the counterclockwise direction as seen from the right hand end of FIG. 5. Under the influence of the magnetic field generated by coil 74 and aided initially by the spring washer 134, the armature 128 moves rightwardly (see FIG. 5) until it engages rotor 110. Cam follower 84 continues to rotate until brake shoe 104 is completely withdrawn from engagement with armature 128. Traverse roll 30 is thereby once again connected to drive shaft 32 via the clutch 66 such that the roll 30 and the package 22 are suitably positioned to be accelerated to operational speed in the manner heretofore described.

Figure 14:
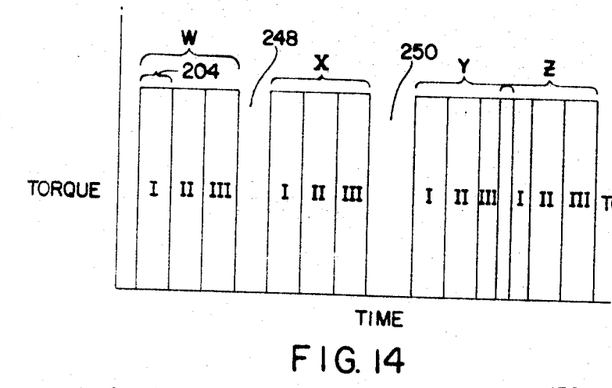
FIG. 14 is a graph similar to that illustrated in FIG. 11 demonstrating still another mode of operating the invention.

Earlier herein, with reference to FIG. 11, it was pointed out that according to a preferred method of operation, the power pulses 204 for controlling rotation of the traverse rolls 30 of a multi-station winding machine are so arranged in time that a new pulse arrives simultaneously as an old pulse decays. However, a modified manner of operation is illustrated in FIG. 14, wherein there is a time spacing or even time overlap between the decay of the last power pulse 204 in one cycle of pulses and the first power pulse 204 in the next subsequent cycle of pulses. This modified manner of operation serves as yet another safeguard against patterning and to this end the time period from the commencement of one cycle to the commencement of the next cycle is caused to vary from cycle to cycle. This is achieved by means of a trigger pulse frequency modulator 246 (see FIG. 8) which may take the form of any suitable electronic circuitry operable to vary the frequency of the output signal 224 from the trigger pulse generator 220 so as to generate output voltage signals 228 at varying time intervals. For example, as seen in FIG. 14, the time spacing indicated at 248 between successive cycles W and X of power pulses 204 may be significantly different from a time spacing 250 between successive pulses X and Y. In a similar manner, the invention allows for operation whereby an overlap of pulses may occur between successive cycles Y and Z. It will be appreciated that the value of overlap of cycles Y and Z is also variable.

Accordingly, the invention disclosed herein is directed to a novel drive mechanism whereby a rotatable member is driven by a continuing sequence of intermittent of pulsed torque forces. When applied to a machine arranged to wind yarn packages, the invention possesses a number of desirable features which result in a superior product at a reduced cost.

Although certain changes may be made in the above apparatus without departing from the scope of the invention herein involved, it is intended that all matters contained in the above description and shown in the accompanying drawings shall be interpreted as illustrative and not in a limiting sense.

What is claimed is:

1. A method of operating winding equipment having a plurality of drive rolls, the drive rolls being normally connected to a source of power and each engaging and rotating an associated package to wind a strand thereon, comprising the steps of causing slippage between the drive rolls and the packages while continuing to wind onto the packages by interrupting periodically the connection of said source of power to each of said drive rolls, and programming the interruptions of the connections of said source of power to said drive rolls to disconnect at least one of said drive rolls from said source of power while maintaining the remainder of said drive rolls connected to said source of power.

2. The method set forth in claim 1 in which said drive rolls are divided into groups and said interruptions are programmed to so disconnect at least one of said groups from said source of power while maintaining the remainder of said groups connected to said source of power.

3. The method set forth in claim 1 in which said programming provides said interruptions in a predetermined sequence.

4. The method set forth in claim 3 including the step of retarding rotation of said rolls during their interruption of connection to said source of power.

5. The method set forth in claim 4 in which the retardation of rotation of the drive rolls is in proportion to the speed thereof.

6. A drive mechanism for winding equipment, comprising a plurality of rotatably supported drive rolls each for engaging and rotating an associated package to wind a strand thereon, a source of power, means normally connecting said drive rolls to said source of power for rotation of said drive rolls, means for causing slippage between the drive rolls and the packages while continuing to wind onto the packages by periodically interrupting the connections of said source of power to said drive rolls, and means for programming the interruptions to disconnect at least one of said drive rolls from said source of power while maintaining the remainder of said drive rolls connected to said source of power.

7. The combination set forth in claim 6 including a continuous strand guiding groove formed about the periphery of each said drive roll.

8. The drive mechanism set forth in claim 6 in which said drive rolls are divided into groups, said programming means is operable to so disconnect at least one of said groups from said source of power while maintaining the remainder of said groups connected to said source of power.

9. The drive mechanism set forth in claim 6 in which said programming means operates said interrupting means according to a predetermined sequence.

10. The combination set forth in claim 6 including brake means for retarding rotation of said rolls during said interruptions of their connection to said source of power.

11. The combination set forth in claim 10 wherein said brake means comprises an eddy current brake operable to retard rotation of said roll in proportion to the speed of the roll.

12. A drive mechanism comprising a rotatably supported drive roll, a source of power for rotating said drive roll and including a drive shaft and bearing means on said drive shaft to support said drive roll, electromagnetic clutch means for connecting said drive roll to said source of power, said clutch means including an electrically conductive coil, a supply of electromotive force connected to said coil to develop a magnetic field therearound, a friction element fixed to said drive shaft, a ferromagnetic armature fixed to said roll for rotation therewith and axially movable against said friction element to drivingly engage said drive roll with said shaft, and resilient means normally biasing said armature toward said friction element, means periodically interrupting said clutch means to disconnect said drive roll from said source of power, and brake means selectively engageable with said armature, and actuating means for moving said brake means against said armature to bias said armature out of engagement with said friction element.

13. The drive mechanism set forth in claim 12, said brake means having a withdrawn position and an extended position, said brake means being engageable with said armature in said extended position to hold said armature away from said friction element and within said magnetic field, and said brake means being spaced apart from said armature when in said withdrawn position, and said actuating means being operable for moving said brake means from said withdrawn position to said extended position.

14. A drive mechanism comprising a stationary frame, a drive shaft, bearing means on said frame for rotatably supporting said drive shaft, a drive roll, support means on said drive shaft for rotatably supporting said drive roll on said drive shaft, a ring-shaped electrically conductive coil fixed to said frame and spaced radially from said shaft, a ferromagnetic rotor fixed to said shaft adjacent said coil and spaced from said drive roll, an annular element on said rotor lying in a plane transverse to the axis of said shaft, a frictional surface on said element facing said drive roll, a ferromagnetic armature intermediate said element and said drive roll, means connecting said armature to said drive roll for rotation therewith while permitting axial movement of said armature relative to said drive roll, a supply of electromotive force electrically connected to said coil and operable to draw said armature into engagement with said frictional surface to connect said drive roll to said shaft for rotation therewith, a cam mounted on said frame, a cam follower engaging said cam, a brake shoe on said follower engageable with said armature, and means for moving said follower relative to said cam to engage said brake shoe with said armature to thereby urge said armature out of engagement with said rotor.

15. The drive mechanism set forth in claim 14 including control means for periodically interrupting said supply to said coil.

16. The drive mechanism set forth in claim 14 including means for adjusting said cam on said frame.

17. The drive mechanism set forth in claim 14 including means for adjusting said cam on said frame.

18. The drive mechanism set forth in claim 14 including a continuous yarn guiding groove formed about the periphery of said drive roll and a rotatably supported yarn package in surface-to-surface engagement with said drive roll.

19. The drive mechanism set forth in claim 14 further comprising an eddy current brake including a ferromagnetic plate and a permanent magnet spaced from said plate, one mounted on each of said frame and said roll.

20. The drive mechanism set forth in claim 19 including means for adjusting the spacing of said magnet relative to said plate.

21. The drive mechanism set forth in claim 20 including means for applying said supply to said coil according to a series of discontinuous pulses defined by the amplitude of said supply and the period during which said supply is applied, and means for adjusting said amplitude and said period.

References Cited

UNITED STATES PATENTS

| | | | |
|---|---|---|---|
| 2,338,914 | 1/1944 | Esser et al. | 242—35.6 |
| 2,430,174 | 11/1947 | Hoover. | |
| 2,618,368 | 11/1952 | Hoover. | |
| 2,624,527 | 1/1953 | Von Kohorn. | |
| 2,853,165 | 9/1958 | Walter et al. | |
| 2,946,418 | 7/1960 | Leeson. | |
| 3,045,935 | 7/1962 | O'Brien | 242—18.1 |
| 3,223,212 | 12/1965 | Shepard. | |
| 3,337,013 | 8/1967 | Wrensch. | |
| 3,361,238 | 1/1968 | Yokel. | |

FOREIGN PATENTS 552,989  12/1956  Italy.

STANLEY N. GILREATH, *Primary Examiner.*

U.S. Cl. X.R.

242—35.5